(12) United States Patent
Koerver et al.

(10) Patent No.: US 12,211,982 B2
(45) Date of Patent: Jan. 28, 2025

(54) ELECTRICAL ENERGY STORE FOR A MOTOR VEHICLE

(71) Applicant: Bayerische Motoren Werke Aktiengesellschaft, Munich (DE)

(72) Inventors: Raimund Koerver, Munich (DE); Sebastian Scharner, Tuerkenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 498 days.

(21) Appl. No.: 17/717,379

(22) Filed: Apr. 11, 2022

(65) Prior Publication Data
US 2022/0328897 A1    Oct. 13, 2022

(30) Foreign Application Priority Data

Apr. 12, 2021   (DE) ...................... 10 2021 108 986.7

(51) Int. Cl.
*H01M 10/613*   (2014.01)
*B60K 1/04*   (2019.01)
(Continued)

(52) U.S. Cl.
CPC ............. *H01M 10/613* (2015.04); *B60K 1/04* (2013.01); *B60L 58/26* (2019.02);
(Continued)

(58) Field of Classification Search
CPC .. H01M 10/613; H01M 10/625; H01M 10/63; H01M 10/6556; H01M 10/6567;
(Continued)

(56) References Cited

U.S. PATENT DOCUMENTS 7,433,794 B1   10/2008  Berdichevsky et al.
2010/0136391 A1*  6/2010  Prilutsky ........... H01M 10/6566
                                                     429/62
(Continued)

FOREIGN PATENT DOCUMENTS

DE   10 2016 219 286 A1   4/2018
EP        2 302 727 A1    3/2011

OTHER PUBLICATIONS

German-language Search Report issued in German Application No. 10 2021 108 986.7 dated Nov. 26, 2021 with partial English translation (12 pages).

*Primary Examiner* — Abdullah A Riyami
*Assistant Examiner* — Nader J Alhawamdeh
(74) *Attorney, Agent, or Firm* — Crowell & Moring LLP

(57) ABSTRACT

An electrical energy store for the storage of electrical energy for a motor vehicle, includes a housing which delimits a receptacle space, storage cells which are arranged in the receptacle space for the storage of the electrical energy, and a line element, which accommodates a through-flow of a coolant fluid for cooling the energy store. The line element has at least one longitudinal region which is routed in the receptacle space and is constituted of a first material having a first melting temperature, and at least one outflow opening that terminates in the receptacle space. A closure element closes the outflow opening and is constituted of a second material, which differs from the first material and has a second melting temperature which is lower than the first melting temperature. The closure element is to be melted for the release of the outflow opening. The storage cells are constituted as solid-body accumulators.

15 Claims, 1 Drawing Sheet

(51) Int. Cl.
*B60L 58/26* (2019.01)
*H01M 10/625* (2014.01)
*H01M 10/63* (2014.01)
*H01M 10/6556* (2014.01)
*H01M 10/6567* (2014.01)

(52) U.S. Cl.
CPC ......... *H01M 10/625* (2015.04); *H01M 10/63* (2015.04); *H01M 10/6556* (2015.04); *H01M 10/6567* (2015.04); *H01M 2200/10* (2013.01); *H01M 2220/20* (2013.01)

(58) Field of Classification Search
CPC ......... H01M 2200/10; H01M 2220/20; H01M 2250/20; H01M 10/653; H01M 10/6551; H01M 50/209; H01M 50/249; H01M 10/0562; H01M 10/0565; H01M 10/635; H01M 10/658; H01M 50/293; H01M 50/636; H01M 50/664; B60K 1/04; B60L 58/26; B60L 58/27; B60L 50/64; Y02E 60/10

See application file for complete search history.

(56) References Cited

U.S. PATENT DOCUMENTS

| | | | |
|---|---|---|---|
| 2014/0342201 A1* | 11/2014 | Andres | H01M 50/682 165/80.4 |
| 2016/0204483 A1* | 7/2016 | Schilder | H01M 10/6567 429/50 |
| 2018/0191038 A1 | 7/2018 | Li et al. | |
| 2019/0229383 A1 | 7/2019 | Hildinger et al. | |
| 2020/0058967 A1 | 2/2020 | Berge et al. | |
| 2020/0058970 A1* | 2/2020 | Schmitz | B60L 50/64 |
| 2022/0328897 A1* | 10/2022 | Koerver | H01M 50/249 |

* cited by examiner

ELECTRICAL ENERGY STORE FOR A MOTOR VEHICLE

CROSS REFERENCE TO RELATED APPLICATION

This application claims priority under 35 U.S.C. § 119 from European Patent Application No. DE 10 2021 108 986.7, filed Apr. 12, 2021, the entire disclosure of which is herein expressly incorporated by reference.

BACKGROUND AND SUMMARY

The invention relates to an electrical energy store for a motor vehicle.

An electrical energy store is known from EP 2 302 727 A1, having a battery housing in which a plurality of cells are arranged.

The object of the present invention is the provision of an electrical energy store for a motor vehicle, such that particularly secure operation of the electrical energy store can be achieved.

According to the invention, this object is fulfilled by an electrical energy store having the features of the independent claims. Advantageous configurations of the invention are the subject matter of the dependent claims.

A first aspect of the invention relates to an electrical energy store, also simply described as a store, for the specifically electrochemical, storage of electrical energy or electric current for a motor vehicle, specifically for a motor vehicle which is specifically configured as a private car. This means that the motor vehicle, in its fully assembled state, incorporates the energy store in which or by means of which electrical energy is stored or is to be stored, specifically electrochemically. The electrical energy store is preferably a high-voltage component, the electric voltage, particularly the electric service voltage or rated voltage of which is preferably greater than 50 volts, specifically greater than 60 volts and, in a particularly preferred manner, is several hundred volts. As a result, for example, particularly large electrical capacities can be delivered for the electrical propulsion, particularly the exclusively electrical propulsion, of the motor vehicle. Accordingly, it is preferably provided that the motor vehicle is configured as a hybrid or electric vehicle, particularly as a battery electric vehicle (BEV). The motor vehicle, for example, in its fully assembled state, comprises at least one electrical machine by means of which the motor vehicle can be propelled, particularly exclusively propelled. For the electrical propulsion of the motor vehicle by means of the electrical machine, the electrical machine is operated in a motor mode, and thus as an electric motor. To this end, the electrical machine is supplied with the electrical energy which is stored in the energy store. The electrical machine is preferably a high-voltage component, the electric voltage, particularly the electric service voltage or rated voltage of which is preferably greater than 50 volts, specifically greater than 60 volts and, in a particularly preferred manner, is several hundred volts.

The electrical energy store comprises a housing which delimits, particularly directly, and thus constitutes or incorporates a receptacle space. The electrical energy store further comprises storage cells for the, particularly electrochemical, storage of the electrical energy. The storage cells are also described as cells. The storage cells are preferably individual cells, and are thus components which are configured as mutually separate. The storage cells, for example, are electrically interconnected. The storage cells are arranged in the receptacle space, and thus in the housing.

The electrical energy store further comprises at least one line element, which accommodates a through-flow of a coolant fluid for the cooling of the energy store, particularly the storage cells. To this end, for example, it is provided that the line element comprises, and particularly directly delimits, a cooling duct, wherein the cooling duct accommodates a through-flow of the coolant fluid. In principle, the coolant fluid can be a gas. It is particularly preferred, however, that the coolant fluid is a liquid, and thus a coolant liquid which, for example, can at least comprise water. For example, the line element is a cooling element, particularly a cooling plate, wherein the storage cells can be thermally connected to the line element. Thus, for example, heat can be transferred from the respective storage cell to the line element, particularly along at least one thermal conduction path along which, for example, the heat can be transferred from the respective storage cell to the line element exclusively or purely by way of a thermal flux between solids. From the line element, the heat transferred to the line element can then be transferred to the coolant fluid, as a result of which the storage cells can advantageously be cooled, particularly in normal operation of the electrical energy store.

The line element comprises at least one longitudinal region which is routed in the receptacle space, having at least one outflow opening which terminates in the receptacle space. This means that the longitudinal region incorporates the outflow opening, or that the outflow opening is configured in the longitudinal region, particularly such that the outflow opening, along its circumferential direction, is fully circumferentially delimited by the longitudinal region or by a wall of the longitudinal region, particularly in a direct manner. The longitudinal region is constituted of a first material such that, preferably, the outflow opening per se, i.e. considered in isolation, particularly in the circumferential direction of the outflow opening, is fully circumferentially delimited by the first material, particularly in a direct manner. The first material has a first melting temperature. Under ambient conditions, i.e. at 20 degrees Celsius and a pressure of 1 bar, the first longitudinal region or the first material is preferably solid, i.e. is a solid body.

A closure element closing the outflow opening is arranged in the outflow opening, which is constituted of a second material, which differs from the first material. The second material has a second melting temperature, which is lower than the first melting temperature. The closure element or the second material, under the above-mentioned ambient conditions, is also solid, i.e. is a solid body. The outflow opening, in the above-mentioned normal operation of the energy store, is thus shut off by means of the closure element, such that the coolant fluid flowing through the line element cannot flow through the outflow opening. In order to release the outflow opening, the closure element is or has been melted or is or has been caused to melt. In other words, the closure element is heated to a temperature which is equal to or greater than the second melting temperature, and is preferably lower than the first melting temperature, such that the closure element is melted, i.e. melted open, particularly while any melting of the longitudinal region is suppressed. By the melting of the closure element, the closure element releases the outflow opening, such that the coolant fluid flowing through the line element can flow through the outflow opening, and can thus flow via the outflow opening out of the line element and into the receptacle space.

In order to be able to realize particularly secure operation of the energy store, it is provided according to the invention that the storage cell or all the storage cells of the electrical energy store is/are constituted as solid-body accumulators, such that the electrical energy store is constituted in the form of a solid-body battery. In a manner sufficiently known from the general prior art, the respective solid-body accumulator is to be understood as follows: the respective storage cell comprises at least two, or exactly two electrodes and an electrolyte, by means of which electric charges can be conveyed by ions such that, via the electrolyte, electric charges are exchangeable or transmittable between the electrodes by means of ions. As the respective storage cell is configured as a solid-body accumulator, both the electrodes and the electrolyte are constituted of a solid or a solid material, and are thus configured as solid bodies.

If, for example, the magnitude of heat-up of the closure element is such that the closure element has a temperature which is equal to or greater than the second melting temperature and, for example, is lower than the first melting temperature, the closure element is melted, as a result of which the outflow opening is released. In consequence, the coolant fluid, which is also simply described as fluid, can flow through the outflow opening, and thus flow via the outflow opening out of the line element and into the receptacle space. In consequence, the coolant fluid can flow directly onto or around the respective storage cell, or at least a respective part of the respective storage cell, in particular at least a part of a respective outer circumferential shell surface of the respective storage cell, i.e. direct contact, as a result of which particularly advantageous cooling, configured in the form of immersion cooling, particularly emergency cooling, of the storage cells can be achieved. The term immersion cooling, or else described as dip cooling, signifies that the coolant fluid flowing through the outflow opening, and thus flowing into the receptacle space, can directly contact the respective storage cell, at least partially, on the outer circumferential side. The above-described heat-up, and the resulting melting of the closure element can occur, for example, in response to a thermal event in one of the storage cells. The thermal event results, for example, from an electrical short-circuit on the one storage cell. The thermal event is, for example, a thermal runaway, or results in a thermal runaway of the one storage cell, as a result of which the storage cell undergoes a strong heat-up. By way of this strong heat-up of the one storage cell, in which the thermal event has occurred, hot particles and/or a hot gas and/or a flame can escape from the one storage cell, such that the one storage cell provides heat. This can result in a heat-up of the longitudinal region and the closure element, such that the closure element is melted whereas, in particular, any melting of the longitudinal region is suppressed. The coolant fluid can thus be deliberately released from the outflow opening, i.e. can be deliberately released from the line element at a location, wherein the closure element or the outflow opening is arranged at the location. In consequence, the storage cells can be cooled by means of the coolant fluid in a particularly advantageous manner, particularly by the above-described immersion cooling such that, for example, any crossover of the thermal event from the one storage cell to another of the storage cells can be prevented.

Such a crossover of a thermal event from one storage cell to another storage cell is also described as thermal propagation, which can be prevented, or at least advantageously delayed, by means of the invention. The above-described immersion cooling is thus an emergency cooling, by means of which a particularly secure operation of the energy store can be achieved.

The invention is particularly based upon the following findings and considerations: solid-body batteries such as, for example, lithium-metal solid-body batteries, exist in various embodiments, which differ from one another with respect to respective material classes of the electrolyte which is configured in the form of a solid electrolyte. A solid-body battery is also described as an ASSB (all-solid-state-battery). A distinction is essentially drawn between sulfide-, oxide- and polymer-based solid electrolytes. A further class of electrolytes for solid-body batteries is that of the gel-based electrolytes. These are fluid-impregnated polymer matrices, such that the respective electrolyte of the respective storage cell can be configured in the form of a body with a solid aspect or a gel with a solid aspect. A key challenge associated with the use of solid-body accumulators, particularly sulfide solid-body accumulators or sulfide solid-body batteries, is posed by a potential escape of a gas from the in particular sulfide solid-body accumulator, wherein the gas can be or comprise hydrogen sulfide. Such an escape of the gas can result, for example, from an accident, or from another undesirable situation. Other sulfur-containing gases such as, for example, sulfur monoxide and sulfur dioxide, may also occur or be present, particularly in the form of breakdown products. Gases such as hydrogen sulfide ($H_2S$), in the case of sulfide solid-body batteries, might also constitute chemical catalysts, or so-called chemical triggers. Additionally, as a material of which one of the electrodes is constituted, lithium metal can be employed, wherein the one electrode which is constituted of the lithium metal can be an anode. Accordingly, the material is also described as the anode material. The above-mentioned gases and the lithium metal are adverse substances and/or can result in further adverse substances, such that it is desirable that any direct contact of components and/or persons with the above-mentioned substances should be prevented. This can be achieved by means of the invention.

The above-mentioned emergency cooling of the energy store, configured in the form of immersion or dip cooling, can prevent the formation of the substances, and/or the substances, so to speak, can be captured and/or enveloped by the coolant fluid flowing from the line element via the released outflow opening, such that any unwanted effects resulting from the substances can be prevented.

The line element, for example, is arranged in a cooling circuit which accommodates a through-flow of the coolant fluid and which, in particular if the coolant fluid at least comprises water, is also described as a cooling water circuit. In the event of the occurrence of a thermal event on at least one of the storage cells, particularly such that, in response to the thermal event, the closure element undergoes heat-up to the extent that the closure element has a temperature which is equal to or greater than the second melting temperature and, for example, is lower than the first melting temperature, the closure element is melted accordingly. The outflow opening is released as a result. The cooling circuit is thus opened, as a result of which the coolant fluid can flow out of the cooling circuit and can flow, in particular directly, into the receptacle space. In consequence, the coolant fluid can contact each of the storage cells directly, at least in part, and the coolant fluid can capture the above-mentioned substances and/or prevent formation of unwanted substances.

The first material is preferably a metallic material, particularly a light metal such as, for example, aluminum. The second material can be, for example, a fusible alloy which melts at, or with effect from the second melting temperature and thus releases, consequently opens, the outflow opening. The second melting temperature is, for example, a temperature at which a storage cell which is configured in the form of a pouch cell opens. The closure element is thus a valve, or functions as a valve which, so to speak, opens independently, i.e. without electrical actuation, in that the valve undergoes heat-up at least to the second melting temperature. It can thus be ensured that, for example, in response to the occurrence of a thermal event, the coolant fluid can flow into the receptacle space and thus can cool the storage cells in an effective and efficient manner.

In order to be able to ensure particularly secure operation of the energy store, in one embodiment of the invention, it is provided that an electric heating element is assigned to the closure element, i.e. an electrically operable heating element by means of which, for the release of the outflow opening and particularly by the electrical operation of the heating element, the closure element is heatable, and can be melted accordingly. The feature whereby the heating element is an electric heating element, is to be understood to mean that the heating element can be supplied with electrical energy or electric current, and is thus electrically operable. By the supply of the electric heating element with electric current, the electric current passes or flows through the heating element, as a result of which the heating element undergoes heat-up. The heating element thus provides heat, by means of which the closure element can undergo heat-up, particularly at least to the second melting temperature. It is particularly provided that the heating element is secured to the closure element, particularly in a direct manner. For example, the heating element is materially bonded to the closure element and for example the heating element is adhesively bonded to the closure element, particularly by the use of an adhesive, by means of which the heating element can be thermally bonded to the closure element in a particularly advantageous manner. The heat provided by the heating element can thus be particularly effectively transferred from the heating element, particularly via the adhesive, to the closure element, whereby the particularly effective and efficient heat-up or heating of the closure element can be achieved. If the electric heating element is electrically operated, particularly in a targeted manner, for the melting of the closure element thereby, the closure element is thus, so to speak, electrically melted or melted away.

The heating element, for example, is electrically operated, i.e. supplied with electric current in the event that, particularly by means of an electronic computing device of the energy store, a transition of the energy store from a normal operating state to a critical state is detected. The critical state is also described as a defective state. This transition from the normal operating state to the or a critical state is detected, for example, by means of the electronic computing device, wherein or if, by means of the electronic computing device, the above-mentioned thermal event, or a thermal event on at least one of the storage cells is detected. The thermal event, for example, is detected by the electronic computing device in that it is determined, by means of the electronic computing device, that a pressure prevailing particularly in the receptacle space exceeds a predefinable or predefined pressure threshold value, and/or that a temperature of the energy store prevailing particularly in the receptacle space exceeds a predefinable or predefined temperature threshold value. If the electronic computing device detects that the energy store has transitioned from the normal operating state to a or the defective or critical state, the electronic computing device, for example, can actuate an actuator, particularly in a targeted manner, particularly such that the electronic computing device provides a signal, particularly an electrical signal. As a result, the heating element is electrically operated, and is thus supplied with electric current whereby the closure element undergoes heat-up, and is ultimately melted. The electronic computing device can thus execute the electrical melting of the closure element in a targeted manner, such that particularly secure operation is conceivable.

A further embodiment is distinguished in that the line element comprises at least a second outflow opening, which terminates in the receptacle space, in which a valve element is arranged which, relative to the line element, is hydraulically and/or pneumatically moveable from a closed position, in which the second outflow opening is obstructed, to an open position, in which the second outflow opening is released, particularly in a targeted manner. The closure element and the melting thereof constitute a first opening mechanism, by means of which the line element or the cooling circuit can be opened, such that the coolant fluid flows into the receptacle space and, as a result, advantageously cools the storage cells and/or captures at least one of the above-mentioned substances, such as, for example, the gas. The valve element and the movability thereof from the closed position to the open position constitute a second opening mechanism, by means of which the line element, and thus the cooling circuit, can be opened. For example, the first outflow opening and the closure element are arranged at a first location in the line element, wherein, for example, the second outflow opening is arranged at a second location, at a distance from the first location. Particularly in the event that the closure element has been melted and the valve element is in the open position, the coolant fluid can simultaneously flow out of the line element at both locations, and flow into the receptacle space, such that the storage cells can be cooled in a particularly effective and efficient manner and/or such that the respective substance, particularly the gas, can be captured by the coolant fluid in a particularly effective manner. Particularly secure operation can be ensured accordingly.

It has proved to be particularly advantageous if the outflow openings are interconnected in a fluidically parallel arrangement. The opening mechanisms are thus parallel mechanisms, i.e. are fluidically parallel-connected or arranged opening mechanisms such that, in the event of a transition of the energy store from the normal operating state to the defective state, there is a very high degree of probability or security that the line element can be opened and the storage cells can be cooled, or the respective substance can be captured by the coolant fluid. Particularly secure operation of the energy store can be ensured accordingly.

A second aspect of the invention relates to an electrical energy store for the, specifically electrochemical, storage of electrical energy for a motor vehicle. The electrical energy store according to the second aspect of the invention comprises a housing, which delimits the receptacle space, particularly in a direct manner. The electrical energy store according to the second aspect of the invention further comprises storage cells which are arranged in the receptacle space, for the, specifically electrochemical, storage of the electrical energy. The electrical energy store according to the second aspect of the invention further comprises a line element which accommodates a through-flow of a coolant fluid for the cooling of the energy store, with at least one longitudinal region which is routed in the receptacle space, having at least one outflow opening which terminates in the receptacle space. The feature whereby the longitudinal region is routed in the receptacle space, is particularly to be understood to mean, for example, that at least part of the receptacle space, particularly in a direct manner, is delimited by the longitudinal region, particularly by an outer circumferential shell surface of the longitudinal region. The preceding embodiments and the embodiments for the electrical energy store hereinafter, according to the first aspect of the invention, can also readily be transferred to the electrical energy store according to the second aspect of the invention, and vice versa.

In order to be able to realize particularly secure operation of the electrical energy store, in the second aspect of the invention, it is provided that, in the outflow opening of the electrical energy store according to the second aspect of the invention, a valve element is arranged which, relative to the line element, is hydraulically and/or pneumatically moveable from a closed position, in which the outflow opening is obstructed, to an open position, in which the outflow opening is released. Advantages and advantageous configurations of the first aspect of the invention are to be considered as advantages and advantageous configurations of the second aspect of the invention, and vice versa.

The feature whereby the valve element is hydraulically moveable from the closed position to the open position, is to be understood to mean that the valve element, by the application or employment of a fluid, which is also described as an actuating fluid, is moveable from the closed position to the open position, particularly by a translational movement. The actuating fluid can be the coolant fluid, or a fluid provided additionally for this purpose and differing from the coolant fluid. The stream of the actuating fluid, for example, can be applied directly to the valve element, and thus pressurize the latter directly, such that the valve element is moveable from the closed position to the open position.

If, for example, the coolant fluid flowing through the line element is employed as the actuating fluid, the valve element is thus hydraulically moveable from the closed position to the open position for example in that, specifically when, specifically by means of the electronic computing device, a transition of the energy store from the normal operating state to the defective state is detected, a pressure increase in the coolant fluid is executed, particularly in a targeted manner such that, for example, a pressure of the coolant fluid is raised from a first value to a second value, which is higher in relation to the first value. To this end, for example, the electronic computing device, particularly when it has detected the transition from the normal operating state to the defective state, actuates a specifically electrically operable pump, by means of which the coolant fluid is conveyed, such that, by the actuation of the pump, the pressure of the coolant fluid is increased. The electronic computing device, for example, actuates the pump such that the electronic computing device provides the above-mentioned, specifically electrical signal, which is received, for example, by the pump. The pump is thus employed, for example, as the above-mentioned actuator.

The feature whereby the valve element is pneumatically moveable from the closed position to the open position, is to be understood to mean that the valve element, by means of a gas, which is also described as an actuating gas, is moveable from the closed position to the open position, particularly by a translational movement. The actuating gas can be, for example, the gas which is released in response to the thermal event from the at least one storage cell on which the thermal event has occurred and in consequence, for example, is applied to the valve element, particularly in a direct manner, and thus pressurizes the valve element, particularly in a direct manner, and thus moves from the closed position to the open position. Moreover, a further gas which differs from the gas that is released from the at least one storage cell can be employed as the actuating gas. If, for example, in response to the thermal event on the at least one storage cell, the gas is released from the at least one storage cell and flows particularly into the receptacle space, a gas pressure, also described as an internal gas pressure is generated, for example, in the receptacle space. If, for example, the internal gas pressure exceeds a specifically predefinable or predefined limiting value, the valve element is moved by means of the internal gas pressure, and thus pneumatically, from the closed position to the open position. To this end, it is particularly provided that the internal gas pressure pressurizes the valve element, at least indirectly, particularly directly. The movement of the valve element from the closed position to the open position is also described as the opening of the valve element. The pneumatic opening of the valve element is particularly advantageous in lithium-ion batteries, i.e. when the respective storage cell is constituted in the form of a conventional lithium-ion storage cell. In this case, a substantial generation of gas can occur in response to a thermal event. In other words, in the event of a thermal event on a lithium-ion storage cell, a large quantity of gas can be generated, which is released from the storage cell on which the thermal event has occurred. In consequence, within a short time, such a high internal gas pressure can occur which exceeds the limiting value, as a result of which the valve element, and thus the outflow opening, are pneumatically opened. In consequence, the coolant fluid can flow out of the line element and into the receptacle space. As a result, the storage cells can be cooled directly by means of the coolant fluid and/or the coolant fluid can capture the gas such that, for example, any direct contact between the gas and a component and/or a person can be prevented.

The influx of the coolant fluid to the receptacle space can have a number of potential advantages. A first of the advantages is a cooling of the storage cells, also described as inter-cell cooling. This term is particularly to be understood to mean that the coolant fluid in the receptacle space can at least partially surround the respective storage cell on the outer circumferential side, as a result of which the respective storage cell, by means of the coolant fluid, is shielded, so to speak, from the respective other storage cells. A second of the advantages is that, by means of the coolant fluid flowing into the receptacle space, heat can be evacuated from the storage cells in a particularly advantageous manner. In place of, or additionally to opening, also described as cell opening, of the at least one storage cell on which the thermal event has occurred, it is possible for, in particular all, external faces or surfaces of the storage cells to be cooled by means of the coolant fluid, as a result of which thermal energy can be evacuated from the storage cells. Moreover, by means of the coolant fluid flowing into the receptacle space, a passivation of reactive surfaces, particularly of the storage cells, can be achieved. If, for example, the thermal event occurs in response to intrusion or damage of the at least one storage cell, it is possible for the coolant fluid to be applied to a location which has been exposed as a result of the intrusion or damage, such as, for example, the electrolyte and/or the lithium metal. In particular, water can react exothermically with cell components or the exposed location. In this case, however, a substantial excess influx should result in an effective heat distribution, as a result of which the exposed location or the exposed locations can be chemically passivated. Heat thus removed slows down the reaction. Moreover, gases for example generated by, or in response to the thermal event can be dissolved in the coolant fluid. A particularly high degree of security can be ensured accordingly.

In order to be able to ensure particularly secure operation of the energy store, in a further embodiment of the invention, the electronic computing device is provided. By means of the electronic computing device, by the provision of at least one, specifically electrical, actuating signal, the valve element, particularly in a targeted or active manner, is hydraulically and/or pneumatically moveable, relative to the line element, from the closed position to the open position. The actuating signal can be the above-mentioned signal. In other words, the electronic computing device, particularly when it detects a or the transition of the electrical energy store from the normal operating state to the defective state, can provide the actuating signal, such that the hydraulic and/or pneumatic movement of the valve element from the closed position to the open position is executed, particularly in a targeted manner. For example, the actuating signal is received by a specifically electrically operable actuator such as, for example, the above-mentioned pump. The actuator is actuated in response, as a result of which, particularly by means of the actuator, the hydraulic and/or pneumatic movement of the valve element from the closed position to the open position is executed. By the actuation of the pump, for example, the coolant fluid is conveyed by means of the pump such that, for example, the pressure of the coolant fluid which, for example, directly contacts or directly pressurizes the valve element is increased, as a result of which the valve element is hydraulically moved from the closed position to the open position. It can thus be ensured that the cooling circuit is opened, such that a particularly secure operation of the energy store is conceivable.

In a further configuration of the invention, the storage cells are arranged sequentially in the receptacle space along a stacking direction.

For the achievement of particularly secure operation, it has proved to be particularly advantageous if, between two respective storage cells adjoining along the stacking direction, a respective spacer element is arranged, such that the storage cells and the spacer elements are arranged in an alternating sequential manner along the stacking direction. In other words, exactly one spacer element, in particular, is arranged between two respective storage cells. It is particularly to be understood that a first of the adjoining storage cells along the stacking direction towards a second of the adjoining storage cells, is at least partially, particularly at least predominantly or entirely overlapped or covered by the spacer element which is arranged between the first and second storage cells. By this arrangement, the adjoining storage cells can be shielded from one another in a particularly advantageous manner such that, for example, any thermal propagation can be prevented.

It has further proved to be particularly advantageous if the respective spacer element, along the stacking direction, is at least partially spaced from the adjoining storage cells. By this arrangement, the coolant fluid flowing into the receptacle space can flow between the spacer element and the respective storage cell, and thus the respective storage cell, on the outer circumferential side, can receive a surrounding flux, particularly over a large area, particularly at least predominantly or completely, and can thus contact directly, as a result of which the storage cells can be cooled in a particularly advantageous manner. Moreover, the gas can be captured by the coolant fluid in a particularly advantageous manner, in particular, can be dissolved in the coolant fluid, as a result of which particularly secure operation is conceivable.

Finally, it has proved to be particularly advantageous if the respective spacer element is constituted of a plastic. By this arrangement, a particularly advantageous shielding, particularly thermal shielding of the adjoining storage cells can be achieved, such that a particularly high degree of security is conceivable.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical or functionally identical elements are identified by the same reference symbols.

DETAILED DESCRIPTION OF THE DRAWINGS

Figure 1:
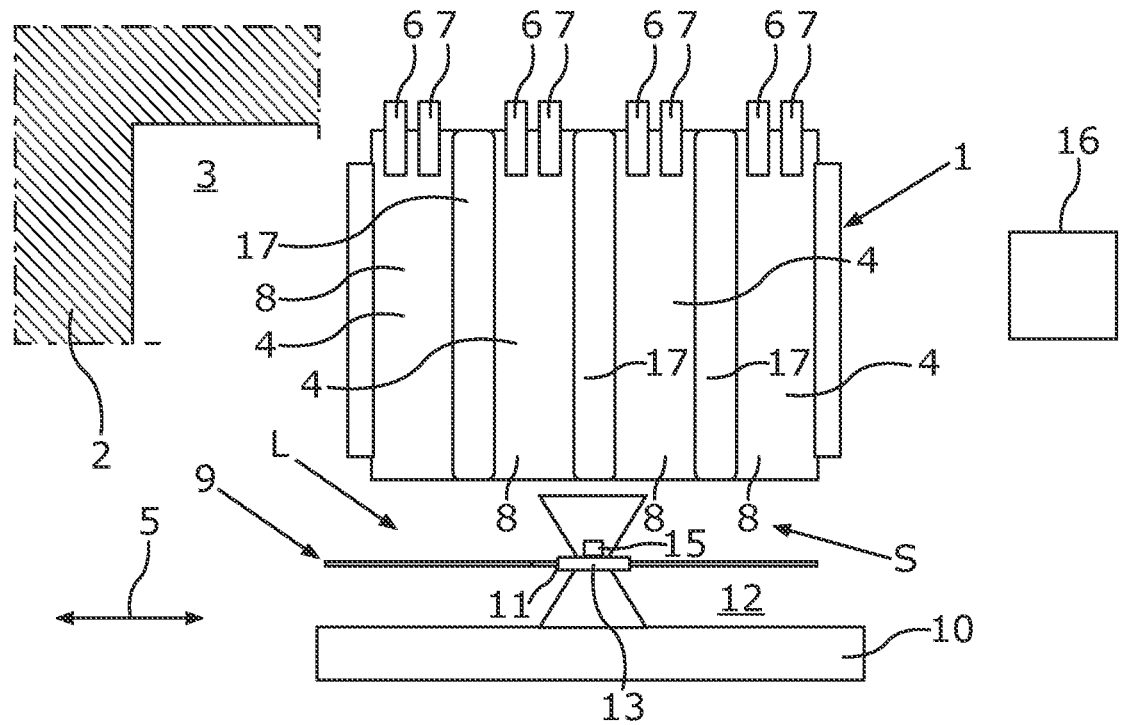
FIG. 1 is a sectional representation of a schematic side view, in section, of an electrical energy store for a motor vehicle, in a normal operating state.

FIG. 1 shows a sectional representation of a schematic side view, in section, of an electrical energy store 1 for a motor vehicle, particularly for a motor vehicle which is preferably configured as a private car. The electrical energy store 1 can store electrical energy or electric current, specifically electrochemically. The electrical energy store 1 has a housing 2 which, in FIG. 1, is represented in a particularly schematic and sectional manner and which, particularly in a direct manner, delimits and thus incorporates a receptacle space 3. The energy store 1 moreover comprises storage cells 4, which are arranged in the receptacle space 3, and thus in the housing 2. The storage cells 4 are individual cells, and are thus components constituted as mutually separate. In the exemplary embodiment represented in the figures, the storage cells 4 are arranged sequentially along a stacking direction which is represented by a double-headed arrow 5, i.e. are arranged one behind another. In particular, it can be provided that the respective storage cell 4 is constituted as a pouch cell. In or by means of the respective storage cell 4, the electrical energy can be stored, particularly electrochemically. To this end, the respective storage cell 4 comprises at least two, or exactly two electrodes. A first of the electrodes is a cathode, wherein the second electrode is an anode. The cathode is or constitutes a positive electrical pole of the respective storage cell 4, and the anode is or constitutes a respective negative electrical pole of the respective storage cell 4. The respective storage cell 4 further comprises at least two, or exactly two terminals 6 and 7, which are also described as terminal connections. For example, the first electrode is electrically connected to the terminal 6, and the second electrode is electrically connected to the terminal 7, wherein the terminals 6 and 7 are at least partially arranged externally to a respective cell housing 8 of the respective storage cell 4. The respective electrodes are arranged in the respective cell housing 8. Thus, for example, the terminal 6 is or constitutes the positive electrical pole of the respective storage cell 4, and the respective terminal 7 constitutes the respective negative electrical pole of the respective storage cell 4. The respective storage cell 4 further comprises an electrolyte, which is not visible in the figures, by means of which electric charges or electric charge carriers can be transferred or exchanged, particularly between the electrodes, particularly by means of ions. The electrolyte is also arranged in the respective cell housing 8.

It is thus contemplated that the respective electrodes of the respective storage cell 4 contact or contact-connect the respective electrolyte of the respective storage cell 4, particularly in a direct manner.

The electrical energy store 1 further comprises at least one line element 9, which can accommodate a through-flow of a preferably liquid coolant fluid. Preferably, the coolant fluid at least comprises water, such that the coolant fluid is also described as cooling water. The line element 9 is preferably a solid body. In particular, the line element 9 is arranged on a side S of the respective storage cell which is averted from the respective terminals 6 and 7. In the mounting position of the energy store 1, for example, the side S of the respective storage cell 4, in the vertical direction of the vehicle, is downward facing. The energy store 1 assumes its mounting position in the fully assembled state of the motor vehicle. As described in greater detail hereinafter, the storage cells 4 can be advantageously cooled by means of the coolant fluid, represented in FIG. 1 by the number 10.

The line element 9 comprises at least one longitudinal region L, which is routed in the receptacle space 3, having an outflow opening 11. In other words, the outflow opening 11 is configured in the longitudinal region L, particularly such that the outflow opening 11 per se penetrates the longitudinal region L per se. The outflow opening 11 is thus a through opening, which terminates on one side or at one end in the receptacle space 3, and on the other side or at the other end in a cooling duct 12 of the line element 9 which accommodates a through-flow of the coolant fluid 10 and is also simply described as a duct. At least in subregions of the line element 9, the cooling duct 12, along its circumferential direction, is entirely circumferentially delimited by the line element 9, particularly in a direct manner. The circumferential direction of the cooling duct 12 is thus oriented about a direction of flow, along which the coolant fluid 10 flows through the cooling duct 12, and thus through the line element 9, particularly during operation of the energy store 1. The longitudinal region L is constituted of a first material. The longitudinal region L is a solid body. Accordingly, the outflow opening 11 per se, along its circumferential direction, is entirely circumferentially delimited by the longitudinal region L or by the first material. The first material has a first melting temperature. The first material is preferably a metallic material.

In the outflow opening 11, a closure element 13 is arranged, which is constituted of a second material. Preferably, the closure element 13 per se is a solid body. The second material has a second melting temperature, which is lower than the first melting temperature. In particular, it can be provided that the second melting temperature is at least 20 degrees Celsius, particularly at least 30 degrees Celsius, and more particularly at least 40 degrees Celsius, or else more than 40 degrees Celsius lower than the first melting temperature. For example, the second melting temperature is at least 100 degrees Celsius lower than the first melting temperature. The closure element 13 is preferably configured as a solid body. By means of the closure element 13, the outflow opening 11 is entirely obstructed, such that the coolant fluid 10 flowing through the line element 9 cannot flow through the outflow opening 11. In order to release the outflow opening 11, the closure element 13 is or has been melted or is or has been caused to melt.

In order to be able to realize a particularly high degree of security in the energy store 1, the storage cells 4 are configured as solid-body accumulators, such that both the respective electrodes of the respective storage cell 4 and the respective electrolyte of the respective storage cell 4 are constituted as solid bodies, and thus of a solid material.

FIG. 1 shows the energy store 1 in a normal operating state, in which no thermal event is present in any of the storage cells 4 of the energy store 1, i.e. in which no thermal event has occurred in any of the storage cells 4 of the energy store 1.

Figure 2:
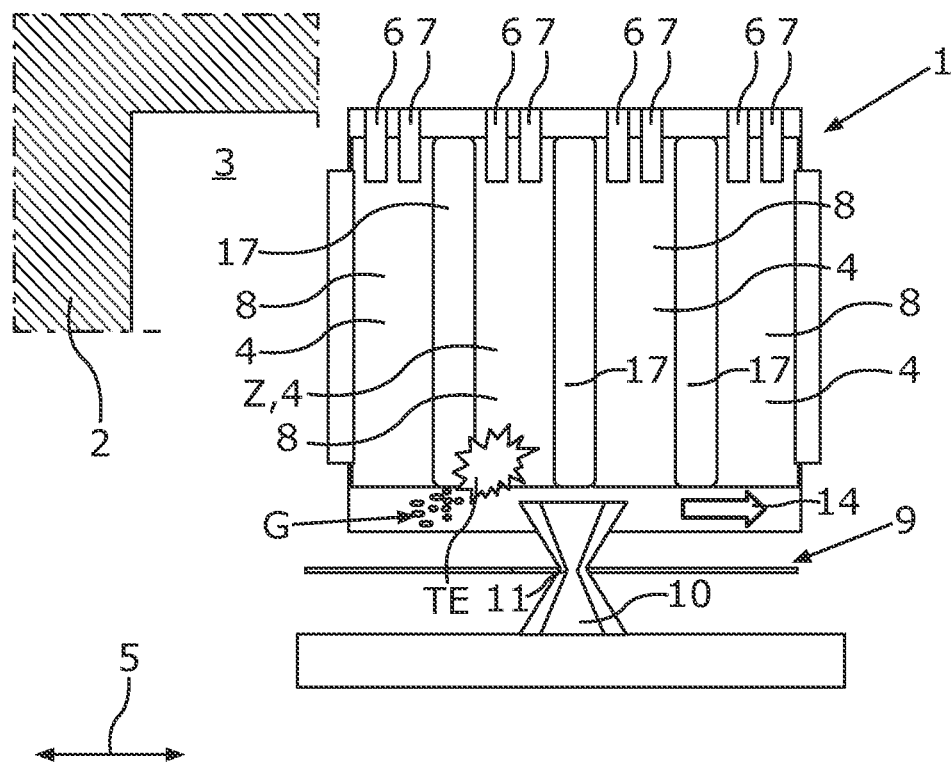
FIG. 2 is a sectional representation of a schematic side view, in section, of the electrical energy store in a defective state.

FIG. 2 shows the energy store 1 in a defective state. The energy store 1 transitions from the normal operating state to the defective state in response to the occurrence on one of the storage cells 4, represented in FIG. 2 by the letter Z, of a thermal event, represented in FIG. 2 by the letters TE. The thermal event TE, for example, occurs in response to an electrical short-circuit on the storage cell Z and/or in response to an intrusion. The electrical short-circuit or the intrusion, for example, result from an accident, such that the thermal event TE, for example, is accident-related. The thermal event TE comprises, for example, a thermal runaway of the storage cell Z, as a result of which the storage cell Z undergoes substantial warming or heat-up. In consequence, for example, a particularly hot gas can be released from the storage cell Z, i.e. from the cell housing 8 of the storage cell Z. The gas in FIG. 2 is represented in a particularly schematic manner, and is identified by the letter G. Alternatively or additionally, in response to the thermal event TE, particularly hot particles can be released from the storage cell Z. The gas G, for example, is or comprises a sulfur-containing gas. In other words, the gas G can be a sulfur-containing gas. It is further contemplated that the particles possibly released from the storage cell Z contain lithium metal which, for example, is a material or originates from a material of which one of the electrodes, particularly the anode, is constituted.

From FIG. 2 it can be seen that, in response to the thermal event TE or in that in response to the thermal event TE, the gas G and/or particles are released from the storage cell Z, the closure element 13 and additionally, for example, the longitudinal region L undergo heat-up. In particular, it is contemplated that the gas G streams directly onto the closure element 13, and can thus contact the latter directly. In particular, for example, the closure element 13, in response to the thermal event TE, is heated to a temperature which is equal to or greater than the second melting temperature and, for example, is lower than the first melting temperature. As a result, the closure element 13 is melted in response to the thermal event TE whereas, for example, any melting of the longitudinal region L is suppressed. By the melting of the closure element 13, the outflow opening 11 is released such that—as represented in FIG. 2—the coolant fluid 10 can flow through the outflow opening 11 and thus out of the line element 9 via the outflow opening 11 and into the receptacle space 3. In consequence, the coolant fluid 10 can flow directly onto and around the respective storage cell 4, and thus contact the latter, on the outer circumferential side, at least partially, particularly at least predominantly, and thus at least to the extent of more than one half, or else completely, as a result of which a particularly advantageous cooling of the respective storage cell 4 can be achieved. The cooling is immersion cooling, also described as dip cooling, as the coolant fluid 10 in the receptacle space 3 directly contacts, or can directly contact the respective storage cell 4 on the outer circumferential side at least partially. The cooling, moreover, is emergency cooling, as the storage cells 4 are cooled by means of the immersion cooling in response to the thermal event TE, and thus in response to a transition of the energy store 1 from the normal operating state to the defective state.

In particular, at least four advantages can be achieved. A first of the advantages is that inter-cell cooling can be achieved. Inter-cell cooling is to be understood to mean that the coolant fluid 10 flowing or flowed into the receptacle space can flow between the storage cells 4 adjoining along the stacking direction, and can thus enclose the respective storage cell on the outer circumferential side, at least in part. In other words, the coolant fluid 10 can flow between the storage cells 4 which are arranged sequentially along the stacking direction, as a result of which intercooling can be achieved. A second of the advantages is that, by means of the coolant fluid 10 flowing into the receptacle space 3, an evacuation of heat, illustrated in FIG. 2 by an arrow 14, can be achieved, in the context of which, by means of the coolant fluid 10, heat can be evacuated from the storage cells 4. To this end, it is particularly provided that the coolant fluid 10 can flow from the outflow opening 11 to at least one outlet opening, which is not visible in the figure, and can flow out of the receptacle space 3 via the outlet opening, such that the coolant fluid 10 can flow from the outflow opening 11 to the outlet opening, and can thus flow through the receptacle space 3. As a result, heat can be evacuated from the storage cells 4 in a particularly effective and efficient manner. A third of the advantages is a, for example, chemical passivation, at least of the storage cell Z which is the site of the thermal event TE. The fourth advantage is that the coolant fluid 10 flowing into the receptacle space 3 can capture the gas G which is released from the storage cell Z, particularly such that the gas G can be dissolved in the coolant fluid 10. In consequence, for example, direct contact between the gas G and components and/or a person can be prevented.

For example, an electric heating element 15, which is represented in FIG. 1 in a particularly schematic manner, is assigned to the closure element 13, by means of which, for the release of the outflow opening 11, the closure element 13 is heatable, and can thus be caused to melt. The energy store 1 thus comprises, for example, an electronic computing device 16, which is represented in the figures in a particularly schematic manner. The electronic computing device 16 can, for example, detect the transition of the energy store 1 from the normal operating state to the defective state, particularly in that the electronic computing device 16 detects that a pressure prevailing in the receptacle space 3 and/or a temperature prevailing in the receptacle space 3 exceeds a specifically predefinable or predefined threshold value. In the event of the detection by the electronic computing device 16 that the energy store 1 has transitioned from the normal operating state to the defective state, the electronic computing device 16, for example, provides at least one specifically electrical signal, which is also described as an actuating signal. The actuating signal is received, for example, by an actuator such as, for example, a switch, in response to which the actuator is actuated. By the actuation of the actuator, for example, the electric heating element 15 is supplied with electric current, which flows through the heating element 15. As a result, the heating element 15 is heated up, and thus provides heat. By means of the heat provided by the heating element 15, the closure element 13 is heated up, particularly at least to the second melting temperature, as a result of which the closure element 13 is melted and, in consequence, the outflow opening 11 is released. The electronic computing device 16 can thus initiate the melting of the closure element 13, and thus the opening of the outflow opening 11, in a targeted or active manner, such that a particularly secure operation of the energy store 1 is conceivable.

From FIGS. 1 and 2, it can further be seen that, between two respective storage cells 4 adjoining along the stacking direction, a respective spacer element 17 is arranged, such that the storage cells 4 and the spacer elements 17 are arranged in an alternating sequential manner along the stacking direction. By means of the respective spacer elements 17, which are arranged between the respective adjoining storage cells 4, the respectively adjoining storage cells 4 are at least partially, particularly at least predominantly, or entirely shielded from one another such that, for example, any propagation, i.e. a crossover of the thermal event TE from the storage cell Z to another of the storage cells 4 can be prevented. In the exemplary embodiment represented in the figures, the respective spacer element 17 is constituted of a plastic. It is moreover provided that the respective spacer element 17, along the stacking direction, is spaced from the respective adjoining storage cells 4 between which the respective spacer element 17 is arranged. Accordingly, the coolant fluid 10, when it is released from the line element 9 via the outflow opening 11 and flows into the receptacle space 3, can flow between the respective spacer element 17 and the respective storage cell 4, as a result of which the storage cells 4 can be cooled in a particularly effective and efficient manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Electrical energy store
2 Housing
3 Receptacle space
4 Storage cell
5 Double-headed arrow
6 Terminal
7 Terminal
8 Cell housing
9 Line element
10 Coolant fluid
11 Outflow opening
12 Cooling duct
13 Closure element
14 Arrow
15 Electric heating element
16 Electronic computing device
17 Spacer element
G Gas
L Longitudinal region
TE Thermal event
Z Storage cell

What is claimed is:
1. An electrical energy store for storing electrical energy for a motor vehicle, comprising:
a housing which delimits a receptacle space;
storage cells which are arranged in the receptacle space for storing the electrical energy;
a line element which accommodates a through-flow of a coolant fluid for cooling the energy store, the line element having at least one longitudinal region which is routed in the receptacle space and is constituted of a first material having a first melting temperature and a first outflow opening which terminates in the receptacle space;
a closure element arranged to close the outflow opening, the closure element being comprised of a second material, which differs from the first material and has a second melting temperature which is lower than the first melting temperature,
wherein the closure element is meltable for releasing the outflow opening, and
wherein the storage cells are solid-body accumulators.

2. The electrical energy store according to claim 1, further comprising:
an electric heating element assigned to the closure element, by which, for releasing the outflow opening, the closure element is heatable, and meltable accordingly.

3. The electrical energy store according to claim 1, wherein
the line element comprises at least a second outflow opening, which terminates in the receptacle space, in which a valve is arranged which, relative to the line element, is hydraulically and/or pneumatically moveable from a closed position, in which the second outflow opening is obstructed, to an open position, in which the second outflow opening is released.

4. The electrical energy store according to claim 3, wherein
the first and second outflow openings are interconnected in a fluidically parallel arrangement.

5. The electrical energy store according to claim 3, further comprising:
an electronic computing device, by which, via at least one actuating signal, the valve, relative to the line element, is hydraulically and/or pneumatically moveable from the closed position to the open position.

6. The electrical energy store according to claim 1, wherein
the storage cells are arranged sequentially in the receptacle space along a stacking direction.

7. The electrical energy store according to claim 6, wherein
between two respective storage cells adjoining along the stacking direction, a respective spacer element is arranged.

8. The electrical energy store according to claim 7, wherein
the respective spacer element, along the stacking direction, is at least partially spaced from the adjoining storage cells.

9. The electrical energy store according to claim 6, wherein,
the respective spacer element is constituted of a plastic.

10. An electrical energy store for storing electrical energy for a motor vehicle, comprising:
a housing, which delimits a receptacle space,
storage cells which are arranged in the receptacle space for storing the electrical energy;
a line element which accommodates a through-flow of a coolant fluid for cooling the energy store, the line element comprising at least one longitudinal region which is routed in the receptacle space and at least one outflow opening which terminates in the receptacle space; and
a valve arranged in the outflow opening which, relative to the line element, is hydraulically and/or pneumatically moveable from a closed position, in which the outflow opening is obstructed, to an open position, in which the outflow opening is released.

11. The electrical energy store according to claim 10, further comprising:
an electronic computing device, by which, via at least one actuating signal, the valve, relative to the line element, is hydraulically and/or pneumatically moveable from the closed position to the open position.

12. The electrical energy store according to claim 10, wherein
the storage cells are arranged sequentially in the receptacle space along a stacking direction.

13. The electrical energy store according to claim 12, wherein
between two respective storage cells adjoining along the stacking direction, a respective spacer element is arranged.

14. The electrical energy store according to claim 13, wherein
the respective spacer element, along the stacking direction, is at least partially spaced from the adjoining storage cells.

15. The electrical energy store according to claim 13, wherein,
the respective spacer element is constituted of a plastic.

* * * * *